United States Patent
Kelly et al.

(10) Patent No.: US 10,299,432 B1
(45) Date of Patent: May 28, 2019

(54) LATCHING MECHANISM FOR PIVOTABLE HANDLE

(71) Applicant: HONDA MOTOR CO., LTD., Tokyo (JP)

(72) Inventors: Teegan L. Kelly, Burlington, NC (US); Christopher Todd Walker, Hillsborough, NC (US); Christopher D. Meeks, Greensboro, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/901,568

(22) Filed: Feb. 21, 2018

(51) Int. Cl.
| | | |
|---|---|---|
| *A01D 34/00* | (2006.01) | |
| *A01D 34/82* | (2006.01) | |
| *A01D 34/68* | (2006.01) | |
| *A01D 34/69* | (2006.01) | |
| *A01D 101/00* | (2006.01) | |

(52) U.S. Cl.
CPC .......... *A01D 34/824* (2013.01); *A01D 34/68* (2013.01); *A01D 34/69* (2013.01); *A01D 2101/00* (2013.01); *B60Y 2200/225* (2013.01)

(58) Field of Classification Search
CPC ...... A01D 34/824; A01D 34/68; A01D 34/69; A01D 34/00; A01D 34/661
See application file for complete search history.

(56) References Cited

U.S. PATENT DOCUMENTS

| | | | | |
|---|---|---|---|---|
| 123,707 | A * | 2/1872 | Kind | ........................ B62B 9/104 280/47.371 |
| 1,609,536 | A | 12/1926 | Carlson | |
| 3,481,123 | A | 12/1969 | Lessig, III | |
| 3,561,201 | A | 2/1971 | Dahl | |
| 3,754,385 | A * | 8/1973 | Hoffmeyer | ............. A01D 34/74 280/43 |
| 5,163,275 | A | 11/1992 | Hare et al. | |
| 5,261,214 | A | 11/1993 | Wollersheim | |
| 6,023,993 | A | 2/2000 | Beugelsdyk et al. | |
| 6,041,584 | A * | 3/2000 | Hohnl | ..................... A01D 34/74 280/43 |
| 7,231,755 | B2 * | 6/2007 | Clarke | ................. A01D 34/824 280/47.315 |
| 8,297,032 | B2 * | 10/2012 | Ninomiya | .............. A01D 34/74 56/17.2 |
| 8,429,885 | B2 | 4/2013 | Rosa et al. | |
| 8,925,293 | B2 | 1/2015 | Mikula et al. | |
| 9,439,352 | B2 * | 9/2016 | Arvidsson | ............. A01D 34/68 |
| 2015/0203138 | A1 * | 7/2015 | Hassell | ..................... B62B 3/04 280/47.34 |

FOREIGN PATENT DOCUMENTS

DE         202012102708 U1    10/2012

* cited by examiner

*Primary Examiner* — Hau V Phan
(74) *Attorney, Agent, or Firm* — Arent Fox LLP

(57) ABSTRACT

An anti-rotation apparatus usable with power driven equipment. The power driven equipment may include a deck, a deck bracket connected to the deck, and a handle. The handle may be pivotally mounted to the deck bracket and capable of rotating in a first direction and a second direction opposite the first direction. The anti-rotation pin has a first portion configured to prevent rotation of the handle in the first rotational direction; and a second portion configured to prevent rotation of the handle in a second rotational direction opposite the first rotational direction.

8 Claims, 5 Drawing Sheets

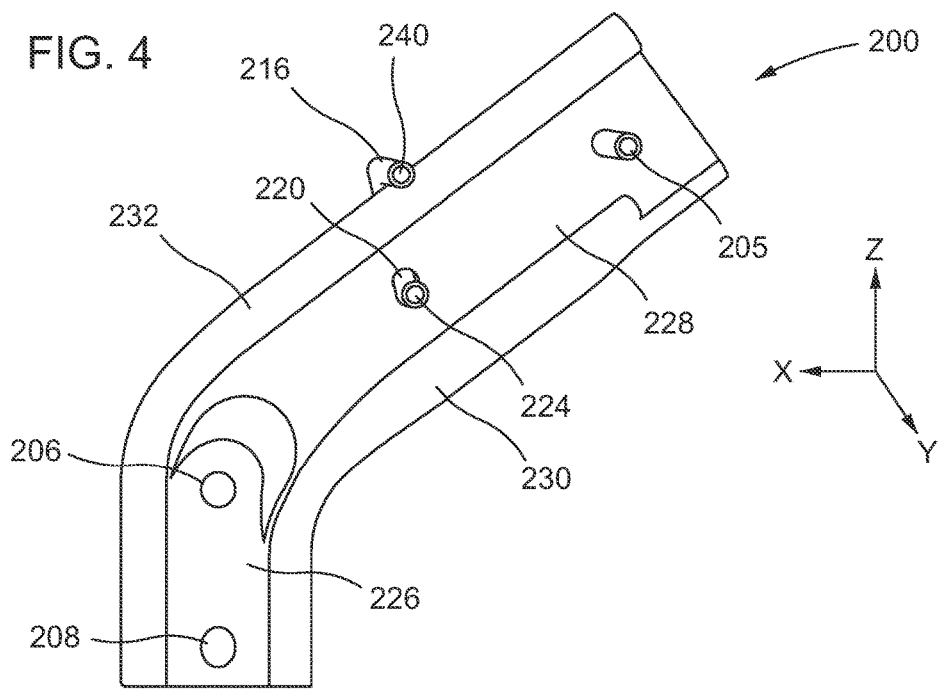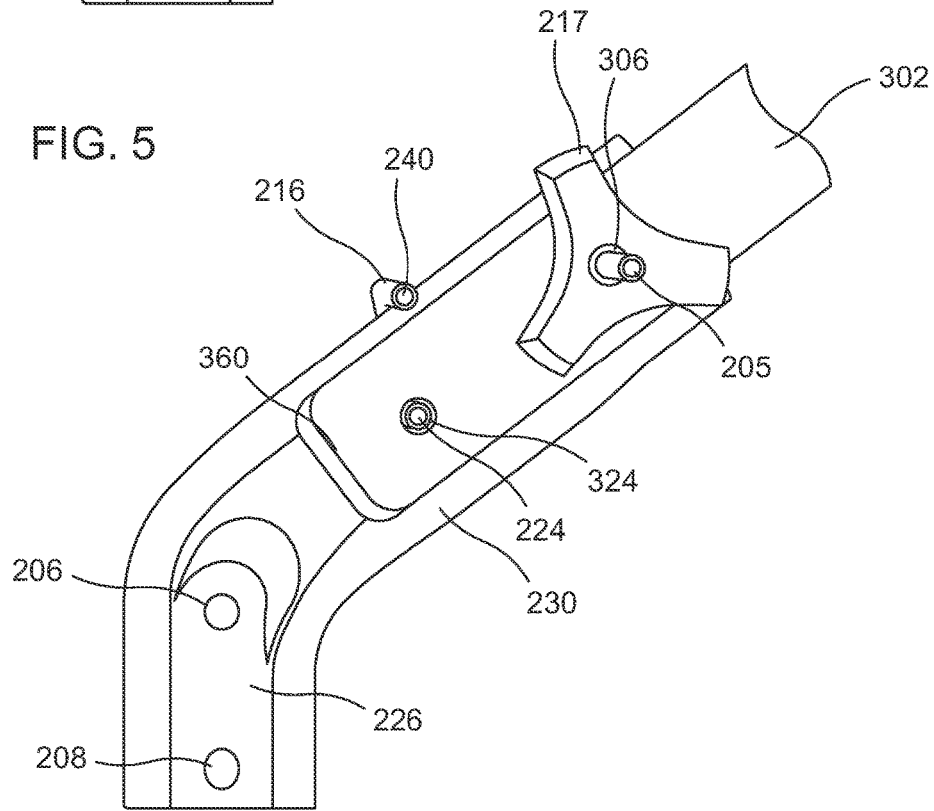

LATCHING MECHANISM FOR PIVOTABLE HANDLE

FIELD OF THE INVENTION

The present disclosure relates generally to power equipment, in particular, to a handle latching arrangement for power equipment usable with a movable handle.

BACKGROUND

Power driven equipment, which may include lawn mowers for example, is frequently equipped with a handle assembly which may be pivotable. For space saving purposes, the aforementioned power equipment may be equipped with a handle assembly that can be reversed or "flipped-over" onto the deck of the power equipment. In a conventional mower, for example, a pivoting handle assembly is attached to the deck of the mower through a plurality of separate structure components, which may include mounting brackets, bolts, nuts, and other hardware which must be assembled together to extend the handle to an operational position. Removal of the handle in the abovementioned example, for storage purposes, is time consuming and tedious process since disassembly is required. Further, a user may incorrectly assemble or disassemble the handle when storing the equipment, which may pose safety concerns.

In order to overcome the abovementioned disadvantages, handle towers and pivot pin mounts have been integrated into the deck housing of the mower, which may eliminate the need for assembly of separate handle mounting and support brackets, which are installed on most mower decks. Accordingly, the handle may be mounted to the mower deck via a bracket that is intended to be permanently fixed to the mower deck and the handle itself may be configured to be pivotable about the bracket. The aforementioned configuration allows the handle to pivot at the bracket, fold down toward the deck of the mower in a storage position, and fold up away from the deck of the mower to an extended or in-use position.

However, the aforementioned configurations cause the handle to rest on the mower deck and/or on the engine and/or accessories of the mower. Aspects of the present disclosure are directed to a mechanism for limiting the rotation a handle when the handle is placed in a stored position. Further, aspects of the present disclosure are directed to a mechanism for securely locating a handle with relation to the bracket, connecting the handle to the mower deck in the extended or in-use position.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, an anti-rotation apparatus usable with power driven equipment is disclosed. The anti-rotation device may include a bracket mountable to a single and/or both sides of the power driven equipment. The bracket may include an anti-rotation pin having a first portion, a connection portion, and a second portion that is substantially parallel to and not coaxial with the first portion. The first portion may extend through a first opening in the bracket and engage with a second opening in the handle to prevent rotation of the handle past a first angle in a first rotational direction. The second portion may abut an outer surface of the handle to prevent rotation of the handle past a second angle in a second rotational direction opposite the first rotational direction.

In accordance with another aspect of the disclosure, an anti-rotation apparatus usable with power driven equipment is disclosed. The anti-rotation apparatus may include an anti-rotation pin mountable to a power equipment device deck bracket. The anti-rotation pin may be configured to prevent rotation of a handle mounted to the power equipment device deck bracket past a first angle in a first rotational direction and a second angle in a second rotational direction opposite the first rotational direction. The anti-rotation pin may include a first portion that engages with a first opening in the handle to prevent rotation of the handle past the first angle in the first direction and a second portion that abuts an outer surface of the handle to prevent rotation of the handle past the second angle. The first and second portions may be connected via a connection portion.

In accordance with another aspect of the disclosure, a power equipment device having an anti-rotation apparatus is disclosed. The power equipment device may include a deck, a deck bracket connected to the deck, and a handle. The handle may be pivotally mounted to the deck bracket and capable of rotating in a first direction and a second direction opposite the first direction. The power equipment device may further include an anti-rotation pin. The anti-rotation pin may include a first portion that engages with a first opening in the handle to prevent the rotation of the handle past a first angle in the first rotational direction. The anti-rotation pin may further include a second portion that is substantially parallel to and not coaxial with the first portion. The first portion may abut an outer surface of the handle to prevent rotation of the handle past a second angle in a second rotational direction opposite the first rotational direction. The first portion and second portion may be connected via a connection portion.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIG. 4 is a right side view of the handle bracket assembly in accordance with one aspect of the disclosure;

FIG. 5 is a right side view of the handle bracket and a handle assembly in accordance with one aspect of the disclosure;

DETAILED DESCRIPTION

The following includes definitions of selected terms employed herein. The definitions include various examples and/or forms of components that fall within the scope of a term and that may be used for implementation. The examples are not intended to be limiting.

Figure 1:
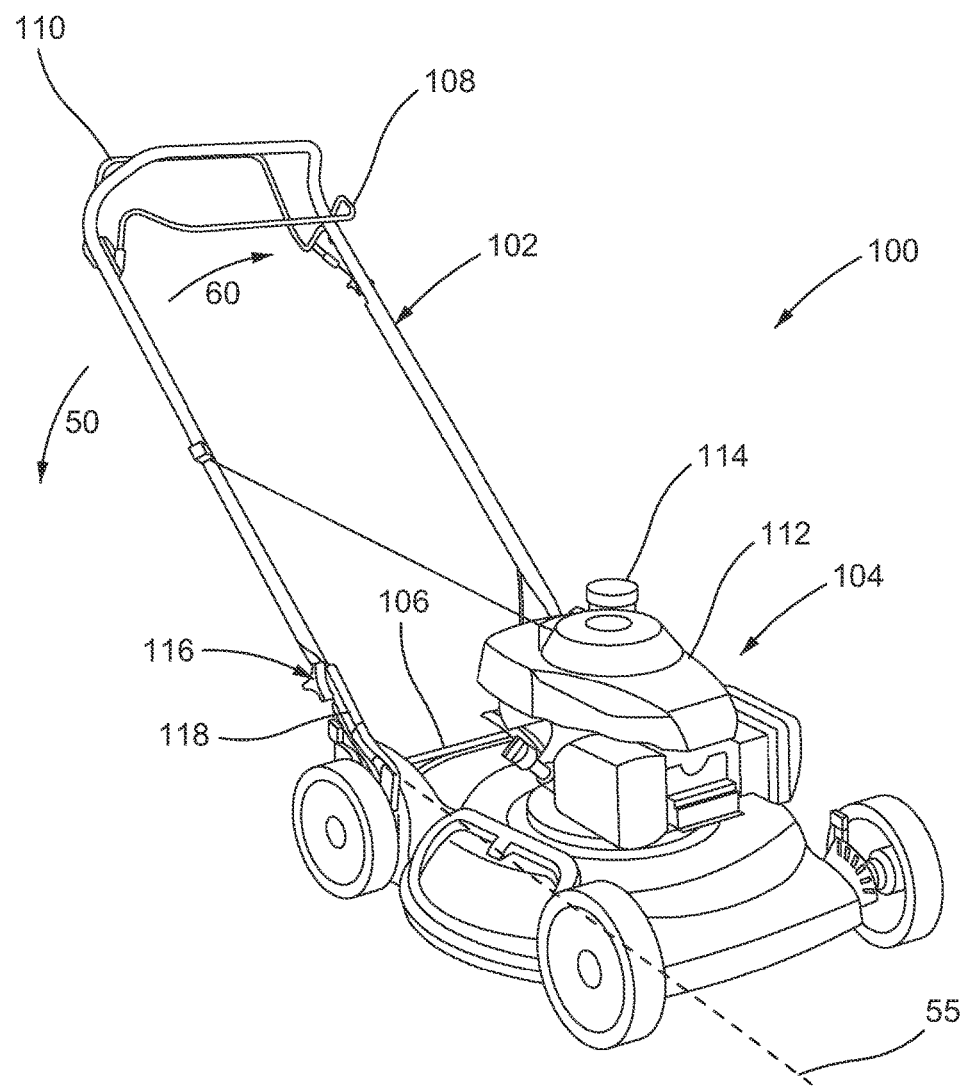
FIG. 1 is a left side perspective view of a lawn mower in accordance with an aspect of the disclosure.

Aspects of the present disclosure relate generally to power equipment, more specifically to a lawn mower. However, one having ordinary skill in the art would understand that the current disclosure is applicable to various equipment employing a handle. Some non-limiting examples may include: power rakes, trimmers, brush mowers, spreaders, edgers, snow blowers, tillers, cultivators, power washers, air compressors, or any type of equipment which would benefit from a foldable handle. FIG. 1 is a simplified example of a lawn mower 100 that is useable with the current disclosure. The lawn mower 100 may include a handle 110, which may further include a series of levers and/or throttles 108 for controlling blade operation and/or for controlling power to the wheels of the mower. The lawn mower 100 may further include a deck 106 and an engine 104, which may include a fuel tank 114 and an engine cover 112. An engine may, include, for example, any known propulsion system which is capable of rotating the blade(s) and powering the wheel(s) of a lawn mower. Some examples of an engine may include a 2-stroke gasoline engine, a 4-stroke gasoline engine, and/or an electric motor. The levers or throttles 108 may be connected to the engine and/or to a transmission through cables (not shown in this view). The handle 102 may be pivotably connected to a deck bracket 118. The deck bracket 118 may include a bolt (not shown) about which handle 102 is capable of rotating when wingnut 116 is loosened.

Figure 2:
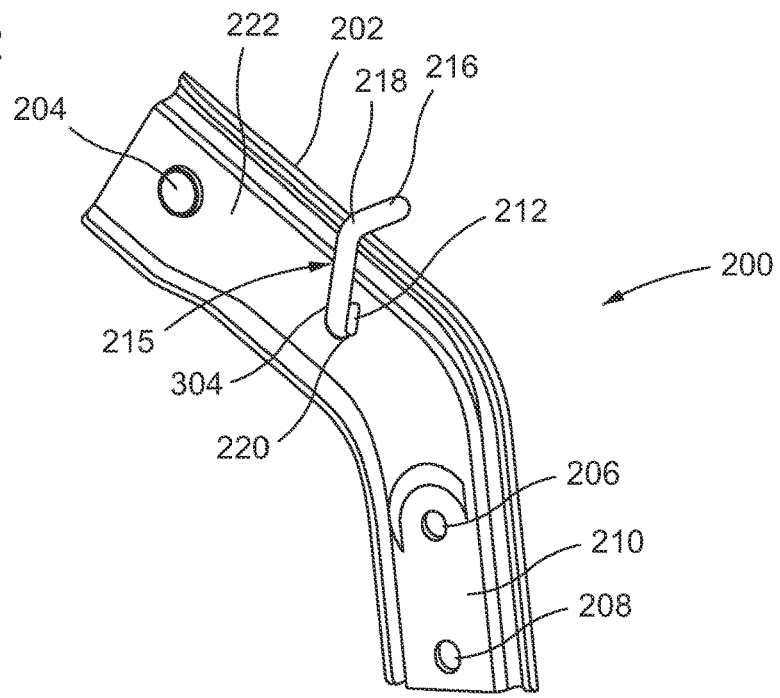
FIG. 2 is a left side perspective view of the handle bracket assembly in accordance with one aspect of the disclosure.
Figure 3:
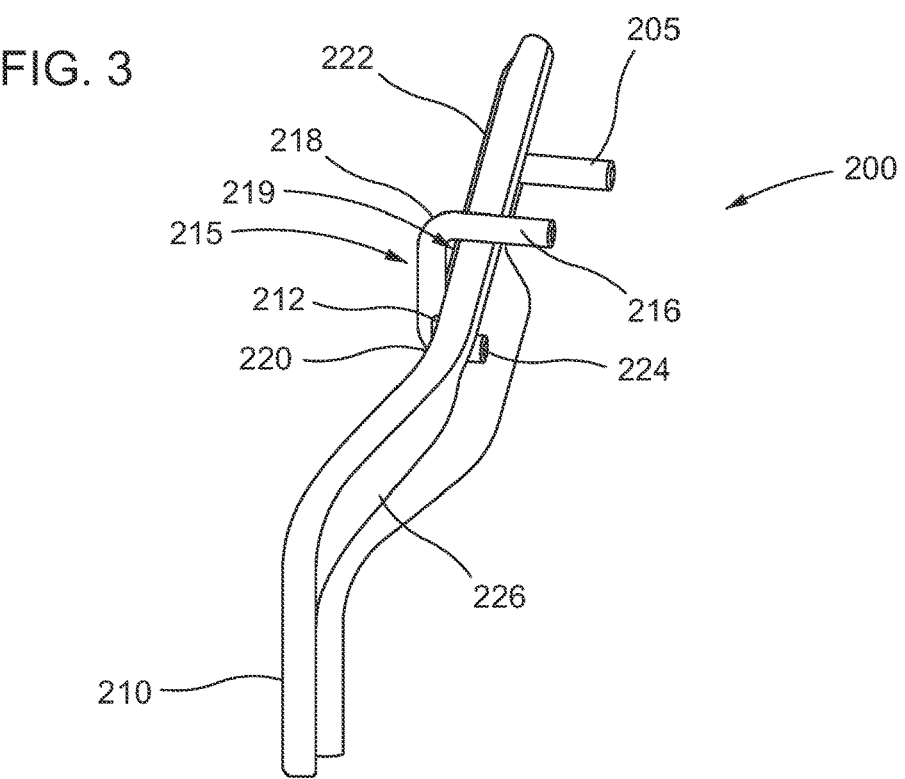
FIG. 3 is a right side perspective view of the handle bracket assembly in accordance with one aspect of the disclosure.

FIG. 2 shows an example of a deck bracket 200 having an anti-rotation pin. The deck bracket 200 includes a bolt 205 (as best seen in FIG. 3), which may be configured to receive a corresponding opening in a handle (e.g., handle 102 in FIG. 1). When bolt 205 is mounted through the corresponding opening in the handle 102, the handle 102 may be pivotable about bolt 205. The bolt 205 may be welded, glued, and/or pressed though an opening 204 in the deck bracket 200. Deck bracket 200 may further include mounting openings 206 and/or 208 which may be used to connect the deck bracket 200 to a deck of a lawn mower, for example. The deck bracket 200 may include a first portion 210 which extends along a first direction and a second portion 222 which extends along a second direction. The first portion 210 may be angled (e.g., between 110 degrees and 160 degrees) with respect to the second portion 222. Further, the deck bracket 200 may include an opening 220 for receiving an anti-rotation pin 215. The anti-rotation pin 215 may include a first portion 224 and a second portion 216. The first portion 224 and the second portion 216 may be connected via a connection portion 304 of the anti-rotation pin. The connection portion 304 of the anti-rotation pin may be substantially perpendicular to the first portion 224 and the second portion 216. The anti-rotation pin 215 may be formed from a piece of round bar stock with two bends forming the first portion 224, the connection portion 304 that is substantially perpendicular to the first portion, and the second portion 216 that is substantially parallel to the first portion 224 and substantially perpendicular to connection portion 304. It is noted that the anti-rotation pin may be formed from different materials having various cross-sectional shapes. For example, the anti-rotation pin may have a square, rectangular, hexagonal, or any other shaped cross-section. Further, the anti-rotation pin may be formed using methods other than bending. For example, the anti-rotation pin may be machined or formed using any well-known method in the art; which may include: welding or otherwise joining several pieces of metal, casting, stamping, 3D printing, or additive manufacturing. Further, the anti-rotation pin may be formed of any durable semi-rigid metallic or non-metallic material. In the example shown in FIGS. 2 and 3, the anti-rotation pin is welded to the deck bracket 200 at a location 212 that is substantially adjacent to an opening 220 formed in the deck bracket 200. However, as an alternative the anti-rotation pin may be press fit into opening 220, or may be fastened to the deck bracket using an adhesive end/or a known mechanical fastening method; some examples of which include but are not limited to bolting and/or riveting.

The example deck bracket 200 shown in FIGS. 2-5 may be formed of a metallic material, for example. Deck bracket 200 may be mounted to a first side of a lawn mower deck, and a deck bracket having similar or identical features that is formed as the mirror image of deck bracket 200 may be mounted to a second side of the lawn mower deck opposite the first side. In one example, the deck bracket 200 may include channels 228 and 226 which may be connected and have a width and depth in the y-axis direction and a width in the z-axis direction that corresponds with a width of the handle 302. A portion of the handle 302 may be received within the channel 228, thereby preventing rotation of the handle 302 within the channel. Ranges 232 and 230 define outer edges of channels 228 and 226 and may be dimensioned so that the width of the channel 228 and 226 decreases with relation to a depth of channel 228 and 226.

FIG. 5 shows a portion of the handle 302 relative to the deck bracket 200 when the handle is in or rotated in a first direction (as best shown by arrow 50 in FIG. 1) to the extended or in-use position. Handle 302 may include a corresponding and oppositely tapering inner surface allowing handle 302 to self-center when clamped against deck bracket 200. As discussed above, the handle may include an opening 306 configured to receive deck bracket bolt 205. As shown in FIG. 5, the bolt 205 may be threaded through opening 306 and the aforementioned clamping force may be provided by a clamping nut 217 that his threaded onto deck bracket bolt 205. As shown the clamping nut 217 may be a wingnut shaped to allow a user to easy tighten and loosen the bolt by hand. The handle 302 may further include an opening 324 that is dimensioned to receive the first portion 224 of the anti-rotation pin when the handle 302 is in the extended or in-use position. Accordingly, engagement of the first portion 224 of the anti-rotation pin with opening 324 in the handle 302 prevents a rotation of the handle, and assists with the positioning of the handle when in the extended or in-use position.

As shown in FIGS. 2-5, the deck bracket 200 may have a plate-like structure having a channel 226 and channel 228. The tapered portion of channel 228 may be configured to receiving the handle 302. Along with the first portion 224 of the anti-rotation pin, the channel 226 may further prevent rotation of the handle past a first angle in the first direction (e.g., direction 50 shown in FIG. 1). As shown in FIGS. 2-5, the connection portion 304 of the anti-rotation pin may be mounted to mounted to a first surface of the bracket via weld 212. The first portion 224 may protrude through an opening 230 so as to protrude from a surface of the channel 228 on a first surface of the bracket 200. The aforementioned first angle may be defined as an angle between the handle 302 (e.g., 102 in FIG. 1) and an imaginary horizontal line (e.g., broken line 55 shown in FIG. 1) within a plane formed by the device deck 106 in a first direction. Further, the second portion 216 of anti-rotation pin may abut an outer surface of the handle 302 (e.g., 102 in FIG. 1) when the handle is rotated in the second rotational direction (e.g., direction 60 in FIG. 1) to prevent rotation of the handle past a second angle. The aforementioned second angle may be defined as an angle between the handle 302 (e.g., 102 in FIG. 1) and an imaginary horizontal line (e.g., broken line 55 shown in FIG. 1) within a plane formed by the device deck 106 in the second direction. The abovementioned first angle may be greater than the second angle.

Figure 6:
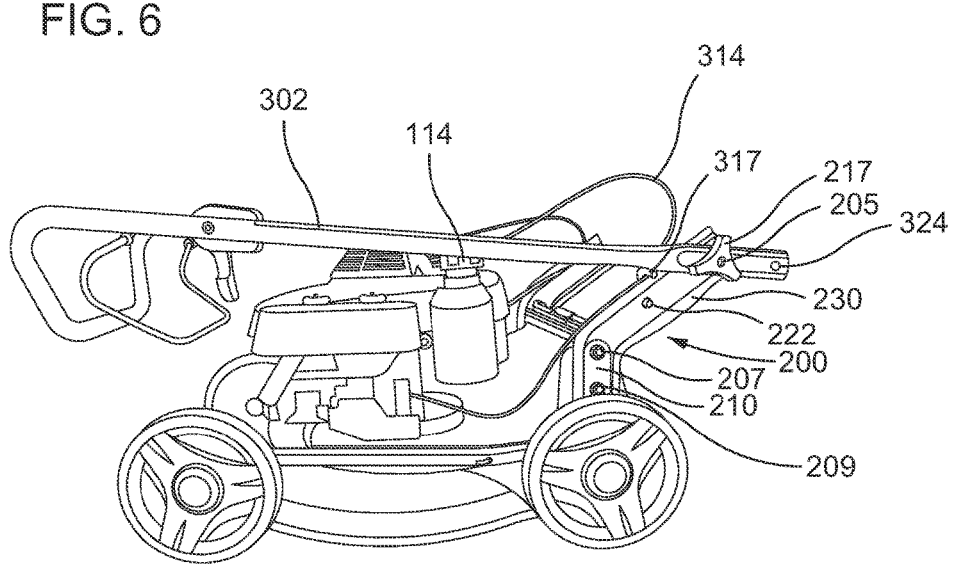
FIG. 6 is a perspective view of an example of a lawn mower employing the handle bracket and handle assembly in accordance with one aspect of the disclosure.
Figure 7:
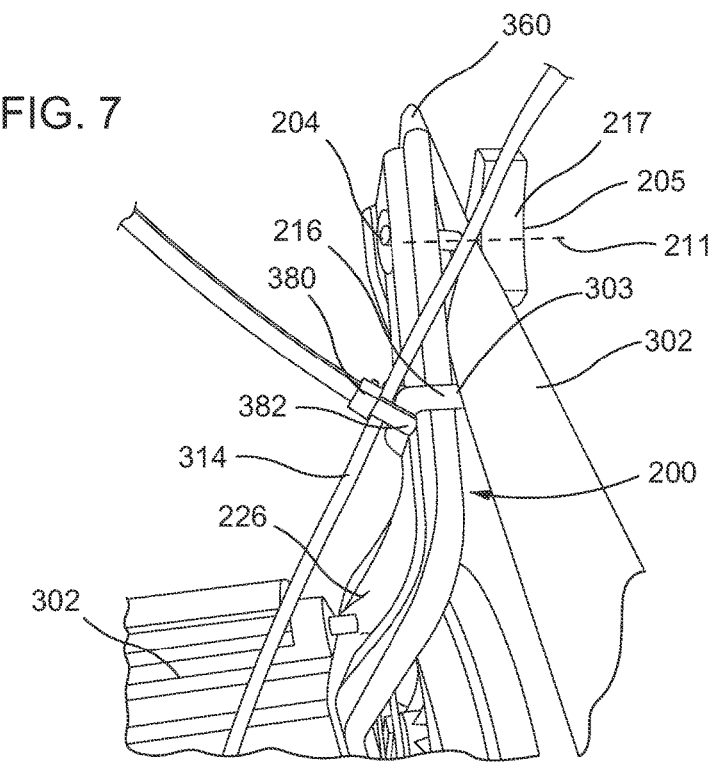
FIG. 7 is a perspective view of an example of a lawn mower employing the handle bracket and handle assembly in accordance with one aspect of the disclosure.
Figure 8:
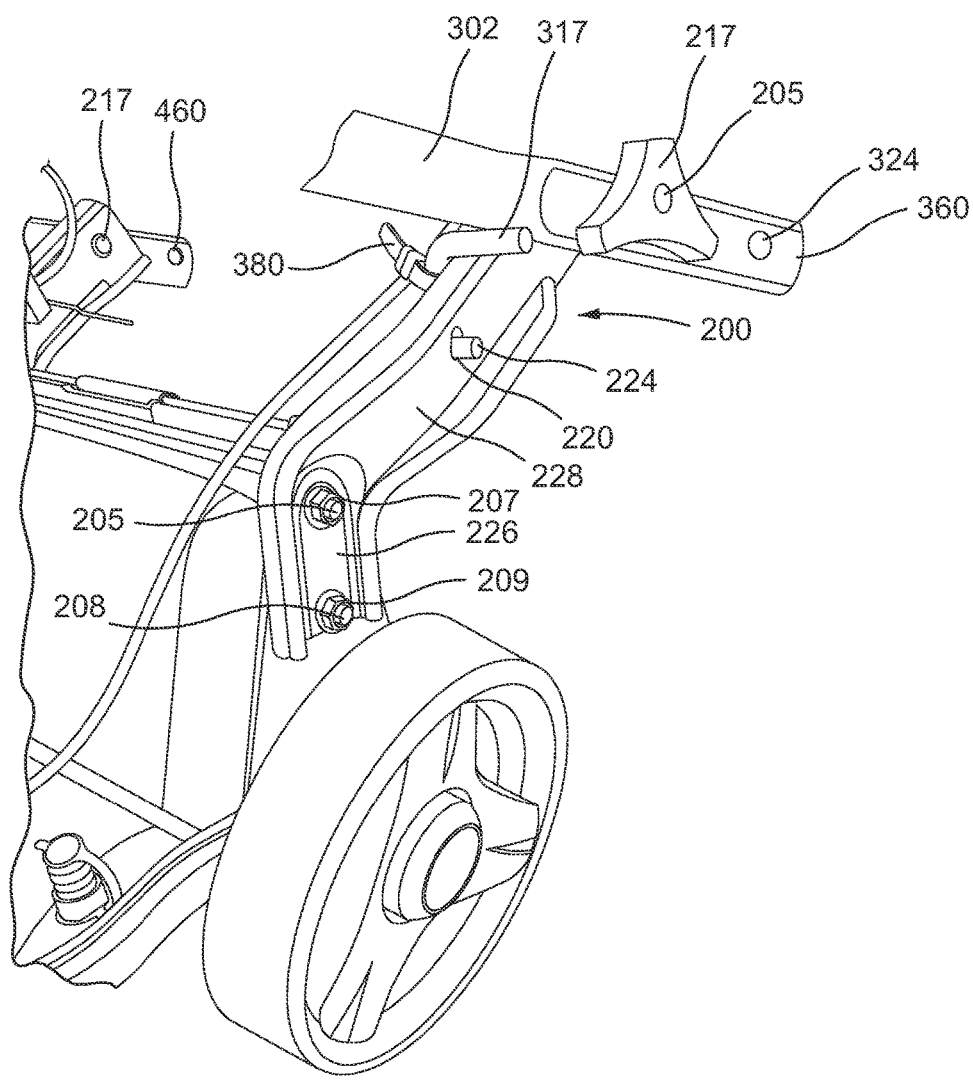
FIG. 8 is a perspective view of an example of a lawn mower employing the handle bracket and handle assembly in accordance with one aspect of the disclosure.

As shown in FIGS. 6-8, a deck bracket 200 may be bolted to a deck of a lawn mower through openings 206 and 208 using bolts 205 and 208 and nuts 207 and 209. Handle 302 may be rotated about an axis 211 formed by deck bracket bolt 205 to a folded or storage position by loosening nut(s) 217 and rotating the handle toward the deck of the lawn mower in a second direction (as best shown by arrow 60 in FIG. 1). FIG. 6 shows one example of anti-rotation pin 215 being configured to stop the rotation of handle 302 past a certain point in the second direction, for example. As one example, the second portion 216 of the anti-rotation pin 215 may be configured to contact a side of the handle and prevent further rotation of the handle 302. In one example implementation, the second portion of the anti-rotation pin may be located such that the handle 302 contacts the second portion 216 and is prevented from rotating to a position where handle 302 can contact any portion of the engine (e.g., engine cover 112, fuel tank, 114, or any other part of the engine 104). As another example, the second portion 216 of the anti-rotation pin may be located such that the handle 302 contacts the second portion 216 at a contact portion 303 and is prevented from rotating to a position where handle 302 can contact the lawn mower deck 106.

Further, as shown in FIGS. 6-8, the anti-rotation pin may include a wire-tie receiving portion 382 to receive a wire-tie 380. The wire-tie may include a single or a group of a plurality of zip-tie, a hook and loop fastener strap, a wire, a clip-on bracket and/or any type of known method of fastening a wire and/or cable to a pin and/or a portion of a pin-shaped device. The wire-tie receiving portion 302 may be configured to receive any number or type of wire-ties, and may be used to fasten a single one of or a group comprising a plurality of throttle, brake, transmission engagement, blade engagement, or any other wire or cables 314 which may run from the handle 302 to any portion of the lawn mower on deck 106. One example of the wire-tie receiving portion is shown in FIG. 7. The wire-tie receiving portion may be a portion 304 of the anti-rotation pin that connects and is substantially perpendicular to the first portion 224 and the second portion 216. As shown in FIGS. 2-7, the wire-tie receiving portion 304 may be configured so that a space 219 (best seen in FIG. 3) exists between wire-tie receiving portion 304 and deck bracket 200; accordingly, space 219 allows a wire-tie to be looped through and fastened through space 219. As mentioned above, the wire-tie may be used to fasten a single or multiple cables to the wire-tie receiving portion 304.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A bracket for mounting a handle to a power equipment device deck, the bracket comprising:
    an anti-rotation pin fixedly mounted to the bracket, the anti-rotation pin comprising a first portion, a connection portion, and a second portion that is substantially parallel to and not coaxial with the first portion, wherein the first portion extends through a first opening in the bracket and engages with a second opening in the handle to prevent rotation of the handle past a first angle in a first rotational direction, wherein the first rotational direction is away from the power equipment deck, and the second portion abuts an outer surface of the handle to prevent rotation of the handle past a second angle in a second rotational direction opposite the first rotational direction, wherein the second rotational direction is towards the power equipment deck.

2. The bracket of claim 1, wherein the bracket has a plate-like structure having a channel for receiving the handle, wherein the channel further prevents rotation of the handle past the first angle in the first direction.

3. The bracket of claim 2, wherein the channel has a tapered portion for receiving the handle.

4. The bracket of claim 1, wherein at least a portion of the connection portion of the anti-rotation pin is mounted to a first surface of the bracket; wherein the first portion protrudes from an opening in the bracket.

5. The bracket of claim 1, wherein the second angle is an angle at which the handle does not contact a motor mounted to the power equipment device deck.

6. The bracket of claim 1, wherein the first angle is defined as an angle between the handle and an imaginary horizontal line within a plane formed by the device deck in a first direction, and the second angle is an angle between the handle and the imaginary line, wherein the first angle is greater than the second angle.

7. The bracket of claim 1, wherein the anti-rotation substantially circular cross-section.

8. The bracket of claim 1, wherein the anti-rotation pin is welded to the bracket.

* * * * *